(12) United States Patent
Blossom, III et al.

(10) Patent No.: US 9,228,074 B2
(45) Date of Patent: Jan. 5, 2016

(54) SPRAY-DRIED, HYDROUS, KAOLIN CLAY AND METHODS OF MAKING SAME

(75) Inventors: George L. Blossom, III, Macon, GA (US); Lewis A. Berry, Mitchell, GA (US)

(73) Assignee: Burgess Pigment Company, Sandersville, GA (US)

( * ) Notice: Subject to any disclaimer, the term of this patent is extended or adjusted under 35 U.S.C. 154(b) by 870 days.

(21) Appl. No.: 13/465,339

(22) Filed: May 7, 2012

(65) Prior Publication Data

US 2013/0296469 A1    Nov. 7, 2013

(51) Int. Cl.

| | |
|---|---|
| *C08K 5/17* | (2006.01) |
| *C08K 3/34* | (2006.01) |
| *C09C 1/42* | (2006.01) |
| *C08L 33/02* | (2006.01) |
| *B01D 1/18* | (2006.01) |

(52) U.S. Cl.
CPC ... *C08K 5/17* (2013.01); *B01D 1/18* (2013.01); *C08K 3/346* (2013.01); *C08L 33/02* (2013.01); *C09C 1/42* (2013.01); *C01P 2004/62* (2013.01); *C01P 2006/22* (2013.01)

(58) Field of Classification Search
CPC ............ C08K 5/17; C08K 3/346; C09C 1/42; C08L 33/02; C01P 2004/62; C01P 2006/22; B01D 1/18
USPC .......................................... 524/447
See application file for complete search history.

(56) References Cited

U.S. PATENT DOCUMENTS

| | | |
|---|---|---|
| 4,118,247 A | 10/1978 | Marchetti et al. |
| 5,006,574 A | 4/1991 | Sennett et al. |
| 5,165,915 A | 11/1992 | Tokubo et al. |
| 5,223,463 A | 6/1993 | Bilimoria |
| 5,591,345 A | 1/1997 | Engelen et al. |
| 2005/0059765 A1 | 3/2005 | Finch et al. |
| 2006/0047047 A1 | 3/2006 | Patel et al. |
| 2006/0107873 A1 | 5/2006 | El-Shoubary et al. |
| 2008/0182743 A1 | 7/2008 | Yildirum et al. |
| 2008/0262142 A1 | 10/2008 | Bradshaw et al. |
| 2010/0324197 A1 | 12/2010 | Bradshaw et al. |
| 2011/0147649 A1 | 6/2011 | Peera et al. |

FOREIGN PATENT DOCUMENTS

| | | |
|---|---|---|
| EP | 2348073 | 7/2011 |
| WO | 2006/041929 | 4/2006 |
| WO | 2006/119063 | 11/2006 |

OTHER PUBLICATIONS

International Search Report and Written Opinion dated Feb. 7, 2014, issued in corresponding PCT application No. PCT/US2013/039907, 10 pgs.

*Primary Examiner* — Angela C Scott

(74) *Attorney, Agent, or Firm* — Meunier Carlin & Curfman LLC

(57) ABSTRACT

A method of producing a spray-dried, hydrous kaolin clay is disclosed that includes mixing a hydrous kaolin clay with water, an ammonium polyacrylate or polyacrylic acid, ammonium hydroxide, and a propanolamine selected from the group consisting of 2-amino-2-methyl-1-propanol, 2-methylamino-2-methyl-1-propanol, 1-amino-2-propanol, or mixtures thereof, to produce a viscosity stable dispersed slurry, and spray drying the slurry to produce the spray-dried, hydrous, kaolin clay. A spray-dried, hydrous kaolin clay is also disclosed.

18 Claims, No Drawings

SPRAY-DRIED, HYDROUS, KAOLIN CLAY AND METHODS OF MAKING SAME

BACKGROUND

Spray-dryable kaolin clay slurries can be prepared by treating the kaolin with chemical agents, including pH-adjusting chemicals and dispersants. These chemical agents are added to reduce the viscosity of the slurries in a cost effective manner and to maintain the stability of the slurries. Most chemical agents used in these processes are retained in the dried products, even after drying and pulverizing. As a result, the dispersants present in the dried product produce a clay that is redispersible in water. Nevertheless, having a redispersible clay can be undesirable in certain products that include clay as a filler and can negatively affect the properties of these products.

SUMMARY

Described herein is a method of producing a spray-dried, hydrous, kaolin clay. The method comprises mixing a hydrous kaolin clay with water, an ammonium polyacrylate or polyacrylic acid, ammonium hydroxide, and a propanolamine selected from the group consisting of 2-amino-2-methyl-1-propanol, 2-methylamino-2-methyl-1-propanol, 1-amino-2-propanol, or mixtures thereof, to produce a viscosity stable dispersed slurry, and spray drying the slurry to produce the spray-dried, hydrous, kaolin clay. In some embodiments, the method can further comprise the steps, prior to the mixing step, of mixing crude kaolin clay with water and a chemical dispersant to produce a dispersed slip, refining the dispersed slip to remove sand and other large non-clay particles from the dispersed slip, removing iron from the refined, dispersed slip by chemical bleaching of the dispersed slip, and filtering the dispersed slip to produce a filter cake having from 53-68% solids and comprising hydrous kaolin clay. The step of mixing the crude kaolin clay with water and the chemical dispersant can include mixing the filter cake with the water, the ammonium polyacrylate or polyacrylic acid, the ammonium hydroxide, and the propanolamine.

In some embodiments, the weight ratio of propanolamine to ammonium polyacrylate or polyacrylic acid is from 3.75:1 to 5.75:1 (e.g., about 4.75:1). In some embodiments, the mixing step comprises mixing the hydrous kaolin with the ammonium polyacrylate or polyacrylic acid in an amount of from 1.1% to 1.3% by weight, the ammonium hydroxide in an amount of 12.6% to 15.4% by weight ammonia (i.e., $NH_3$), and the propanolamine in an amount of 5.1% to 6.3% by weight, the balance being substantially water. Optionally, the method can further comprise the step of heating the spray-dried, hydrous, kaolin clay to a temperature of from 500° C. to 850° C. to produce a metakaolin clay. Optionally, the method can further comprise the step of heating the spray-dried, hydrous, kaolin clay to a temperature of from above 800° C. to 1100° C. to produce a fully calcined clay.

The hydrous kaolin, after said mixing step, can have from 50% to 65% solids. In some embodiments, the pH after the mixing step is from 7.6 to 10. The pH after the spray drying step can be from 5 to less than 8.5. In some embodiments, the viscosity of the slurry after the mixing step is less than 1000 cP under agitation for a period of 5 days after the slurry is formed. In some embodiments, the viscosity after the spray drying step is at least 2000 cP at 50% solids.

Also described herein is a spray-dried, hydrous kaolin clay, comprising a propanolamine selected from the group consisting of 2-amino-2-methyl-1-propanol, 2-methylamino-2-methyl-1-propanol, 1-amino-2-propanol, or mixtures thereof, and an ammonium polyacrylate or polyacrylic acid. The amount of ammonium polyacrylate or polyacrylic acid is less than 18 pounds per ton of dry clay (e.g., less than 15 pounds per ton of dry clay, less than 12 pounds per ton of dry clay, less than 6 pounds per ton of dry clay, less than 3 pounds per ton of dry clay, less than 2 pounds per ton of dry clay, or less than 1 pound per ton of dry clay). In some embodiments, the clay, if added to water, is not substantially redispersible in water. In some embodiments, the weight ratio of propanolamine to ammonium polyacrylate or polyacrylic acid is from 3.75:1 to 5.75:1 (e.g., about 4.75:1). Optionally, the pH of the dry clay is from 5 to less than 8.5 and the viscosity is at least 2000 cP at 50% solids.

The details of one or more embodiments are set forth in the description below. Other features, objects, and advantages will be apparent from the description and from the claims.

DETAILED DESCRIPTION

Spray-dried, hydrous kaolin clays and methods for their preparation are disclosed herein. The methods include a combination of chemicals that will allow existing filtering, slurrying, and spray-drying equipment to be utilized. The methods described herein allow typical productions rates for filters and mixers to be preserved for a normal spray drier operation while producing a product historically manufactured on equipment such as an apron drier having only a fraction of the production rate of a spray drier. The surface chemistry of the kaolin clay is modified such that the behavior of the dried product, in terms of viscosity and pH, is similar to an acid flocced or air floated kaolinite product. In addition, the methods produce a stable pre-dried feed slurry that can be maintained for several days prior to spray drying.

The method for producing the spray-dried, hydrous kaolin clay includes mixing a hydrous kaolin clay with water, an ammonium polyacrylate or polyacrylic acid, ammonium hydroxide, and a propanolamine selected from the group consisting of 2-amino-2-methyl-1-propanol, 2-methylamino-2-methyl-1-propanol, 1-amino-2-propanol, or mixtures thereof, to produce a viscosity stable dispersed slurry, and spray drying the slurry to produce the spray-dried, hydrous, kaolin clay. The kaolin clay produced according to this method has the characteristics of an acid flocced or air-dispersed kaolin clay.

In some embodiments, the method can include mixing crude kaolin clay with water and a chemical dispersant (i.e., a primary dispersant) to produce a dispersed slip. These components can be mixed, for example, in a bladed mixer such as a blunger. The chemical dispersant can be, for example, sodium carbonate, sodium hexametaphosphate, sodium tripolyphosphate, tetrasodium pyrophosphate, alkaline silicates, polyacrylates, polymethacrylates, or mixtures of these. The dispersed slip can have a solids content of from 35-45%.

The dispersed slip can then be refined to remove sand and other large, non-clay particles from the dispersed slip. A device such as a "sandbox" can be used to remove the larger particles. Fine debris can be optionally removed by using a hydrocyclones apparatus and/or sieves.

The dispersed slip can then be separated into grades using centrifugation. The brightness and color of the grades can be adjusted using a beneficiation process. The beneficiation process can be performed using, for example, water, magnetic separators, chemical augmented magnetic separation (CAMS), float cell, and ozonation units. In some embodiments, the solids contents of the grades can be reduced to about 30% prior to the beneficiation process.

The method can further include a step of removing iron from the refined, dispersed slip by chemical bleaching (or leaching) of the dispersed slip. The chemical bleaching can be performed by adding sulfuric acid to the dispersed slip, which neutralizes the dispersant and flocculates the slip. Sodium dithionite can be added under acidic conditions to reduce ferric iron to ferrous iron. The chemical bleaching process improves the brightness and color of the slip.

The dispersed slip can then be filtered to produce a filter cake that comprises the hydrous kaolin clay. The filter cake can be rinsed with water to further remove chemicals. The resulting filter cake has a solids content of from 53% to 68%. For example, the filter cake can have a solids content of from 55% to 65% or from 58% to 63%.

The hydrous kaolin clay, such as the filter cake produced according to the optional steps discussed above, can then be reblunged by mixing with water, ammonium polyacrylate or polyacrylic acid, ammonium hydroxide, and propanolamine using a paddle or blade mixer to produce a reblunged slip. The ammonium polyacrylate or polyacrylic acid can be present in an amount of from 1.0% to 1.5% by weight. For example, the ammonium polyacrylate or polyacrylic acid can be present in an amount of 1.1% by weight, 1.2% by weight, 1.3% by weight, or 1.4% by weight. Optionally, the ammonium polyacrylate can be prepared from ammonia and polyacrylic acid. Ammonium hydroxide can be included in an amount of 12.6% to 15.4% by weight ammonia. For example, sufficient ammonium hydroxide can be included to provide 12.7% by weight, 12.8% by weight, 12.9% by weight, 13.0% by weight, 13.1% by weight, 13.2% by weight, 13.3% by weight, 13.4% by weight, 13.5% by weight, 13.6% by weight, 13.7% by weight, 13.8% by weight, 13.9% by weight, 14.0% by weight, 14.1% by weight, 14.2% by weight, 14.3% by weight, 14.4% by weight, 14.5% by weight, 14.6% by weight, 14.7% by weight, 14.8% by weight, 14.9% by weight, 15.0% by weight, 15.1% by weight, 15.2% by weight, or 15.3% by weight ammonia. One or more propanolamines can also be added in an amount of from 5.1% by weight to 6.3% by weight. For example, the propanolamine can be added in an amount of from 5.2% by weight, 5.3% by weight, 5.4% by weight, 5.5% by weight, 5.6% by weight, 5.7% by weight, 5.8% by weight, 5.9% by weight, 6.0% by weight, 6.1% by weight, or 6.2% by weight. The propanolamine can be a compound that is in compliance with 21 C.F.R. §§175 and 176 for food packaging and can be 2-amino-2-methyl-1-propanol, 2-methylamino-2-methyl-1-propanol, 1-amino-2-propanol, or a mixture of these. In some examples, the weight ratio of propanolamine to ammonium polyacrylate or polyacrylic acid is from 3.75:1 to 5.75:1 (e.g., about 4.75:1). Water is included as the balance of the mixture. Optionally, the water, ammonium polyacrylate or polyacrylic acid, ammonium hydroxide, and propanolamine are mixed together prior to combining with the clay.

The resulting reblunged slip (i.e., the hydrous kaolin after the mixing step) is a viscosity stable dispersed slurry that can contain from 50% to 65% solids. For example, the resulting reblunged slip can contain 53% to 62% or 55% to 60% solids. The pH of the reblunged slip can be from 7.6 to 10 (e.g., from 8.0 to 9.5 or from 8.5 to 9.0). The viscosity of the reblunged slip can be less than 1000 cP under agitation for a period of 5 days after the slurry is formed. For example, the viscosity can be less than 900 cP, less than 800 cP, less than 700 cP, less than 600 cP, less than 500 cP, or less than 400 cP (e.g., 300 cP).

The method then includes the step of spray drying the slurry, for example, at a temperature of from 300° F. to 450° F., to produce the spray-dried, hydrous, kaolin clay. The spray-dried clay can also be described as a predispersed spray dried beaded kaolin clay. The spray-drying step removes the ammonium hydroxide provided in the chemical dispersant. The pH of the spray-dried slurry is from 5 to less than 8.5 (e.g., from 5.5 to 7.5 or from 6.0 to 7.0). The viscosity of the spray-dried slurry is at least 2000 cP at 50% solids (i.e., when combined with water to produce 50% solids). For example, the viscosity of the spray-dried slurry can be greater than 2000 cP, greater than 2500 cP, or greater than 3000 cP at 50% solids.

The spray-dried clay can be heated to produce a metakaolin clay or a fully calcined clay. In some embodiments, the method can further include the step of heating the spray-dried, hydrous kaolin clay to a temperature of from 500° C. to 850° C. to produce a metakaolin clay. In other embodiments, the spray-dried, hydrous kaolin clay can be heated to a temperature of from above 800° C. to 1100° C. to produce a fully calcined clay.

The resulting spray-dried clays include a propanolamine selected from the group consisting of 2-amino-2-methyl-1-propanol, 2-methylamino-2-methyl-1-propanol, 1-amino-2-propanol, or mixtures thereof, and an ammonium polyacrylate or polyacrylic acid. The amount of ammonium polyacrylate or polyacrylic acid is less than 18 pounds per ton of dry clay (e.g., less than 15 pounds per ton of dry clay, less than 12 pounds per ton of dry clay, less than 6 pounds per ton of dry clay, less than 3 pounds per ton of dry clay, less than 2 pounds per ton of dry clay, or less than 1 pound per ton of dry clay). The spray-dried clay, if added to water, is not substantially redispersible in water. The redispersibility is determined by measuring the viscosity at 50% solids. For example, the viscosity is at least 2000 cP at 50% solids.

The spray-dried clays produced according to the methods described herein can be used to manufacture articles that have indirect food contact (e.g., in food packaging) as allowed under federal regulations. For example, the methods produce kaolin products that can be used in products such as paper and paperboard that can be in indirect contact with aqueous or fatty foods as regulated by the FDA in accordance with 21 C.F.R. §§175 and 176. The clays are also free of crystalline silica. Furthermore, the methods described herein allow for an average throughput consistent with traditional methods of preparation. This is a substantial improvement over known methods in the art, which can have very low tons/hour.

The examples below are intended to further illustrate certain aspects of the methods and compositions described herein, and are not intended to limit the scope of the claims. Parts and percentages are provided on a weight basis herein, unless indicated otherwise.

EXAMPLES

Example 1

Chemical Dispersant Preparation

TABLE 1

| Material | % by Weight | Gallons for 200 gallon mix |
| --- | --- | --- |
| Aqueous Ammonia (28%) | 50 | 100 |
| Water | 43.1 | 74 |
| COLLOID 102 | 1.2 | 4.5 |
| AMP-95 | 5.7 | 11.5 |

The materials listed above were combined to form a chemical dispersant for use in the methods described herein. COL- LOID 102 is an ammonium polyacrylate commercially available from Kemira (Atlanta, Ga.). AMP-95 is 2-amino-2-methyl-1-propanol and 2-methylamino-2-methyl-1-propanol commercially available from Angus (Buffalo Grove, Ill.).

Examples 2-5

Dispersed Slurry Preparation

TABLE 2

| Parameter/Grade | Example 2 (Water Washed) | Example 3 (Water Washed) | Example 4 (Water Washed) | Example 5 (Air Float) |
|---|---|---|---|---|
| Cake Solids (%) | 57.8 | 59.3 | 63.9 | 100 |
| Chemical Dosage (pounds/ton of clay) | 8.2 | 14.6 | 8.7 | 23.3 |
| Slip pH | 7.6 | 8.9 | 8.7 | 10.0 |
| Slip Viscosity (cP) | 150 | 270 | 170 | 150 |
| Slip Solids (%) | 57.5 | 54.1 | 56.7 | 56.1 |
| Chemical Cost ($/ton of clay) | 5.69 | 10.18 | 6.02 | 16.25 |
| Dry pH | 5.79 | 5.82 | 6.05 | 6.64 |
| Dry Viscosity (cP) @ 50% Solids | 9600 | 6000 | 3000 | 10,000 |
| Average Micron Size | 0.35 | 0.40 | 1.40 | 0.50 |

Water washed (Examples 2-4) and air-floated (Example 5) kaolinite slurries were prepared. Crude kaolin clay was mixed with water and the chemical dispersant provided in Example 1 to produce a dispersed slip. Sand and other large non-clay particles were removed from the dispersed slip and then the dispersed slip was chemically bleached using sulfuric acid and sodium dithionite. The resulting dispersed slip was then filtered to produce a filter cake. The properties of the cake and the spray dryable slip are provided in Table 2.

Comparative Examples 1-3 and Examples 6-8

Dosages and Potential Cost Savings

| Sample ID | Measured Dosage Lbs./Ton Dry Clay Mixture from Table 1 | Assayed Dosage Lbs. Ammonium Polyacrylate/Ton Dry Clay | $/Ton |
|---|---|---|---|
| Comp. Ex. 1 | Not Applicable | 22.24 | 15.12 |
| Comp. Ex. 2 | Not Applicable | 21.18 | 14.40 |
| Comp. Ex. 3 | Not Applicable | 22.71 | 15.44 |
| Example 6 | 8.2 | Not Applicable | 6.03 |
| Example 7 | 14.63 | Not Applicable | 10.78 |
| Example 8 | 8.67 | Not Applicable | 6.38 |

Comparative Examples 1, 2, and 3 are standard product samples prepared using ammonium polyacrylate chemical dispersants. LECO carbon analysis (LECO Corporation; St. Joseph, Mich.) of the ammonium polyacrylate used to disperse the filter cakes was used to calculate the assayed dosages at the ammonium polyacrylate price of $0.68 per pound. Examples 6, 7, and 8 are filter cakes, corresponding to Examples 2, 3, and 4, respectively, dosed with the chemical dispersant as described in Example 1 and then oven dried. The actual measured amounts were totaled up using $0.30 per pound for ammonium hydroxide, $0.68 for ammonium polyacrylate, and $4.40 per pound for list price of AMP-95.

The products and methods of the appended claims are not limited in scope by the specific products and methods described herein, which are intended as illustrations of a few aspects of the claims and any products and methods that are functionally equivalent are intended to fall within the scope of the claims. Various modifications of the products and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

What is claimed is:

1. A method of producing a spray-dried, hydrous, kaolin clay, comprising:
    mixing a hydrous kaolin clay with water, an ammonium polyacrylate or polyacrylic acid, ammonium hydroxide, and a propanolamine selected from the group consisting of 2-amino-2-methyl-1-propanol, 2-methylamino-2-methyl-1-propanol, 1-amino-2-propanol, or mixtures thereof, to produce a viscosity stable dispersed slurry; and
    spray drying the slurry to produce the spray-dried, hydrous, kaolin clay,
    wherein the weight ratio of the propanolamine to the ammonium polyacrylate or polyacrylic acid is from 3.75:1 to 5.75:1.

2. The method according to claim 1, further comprising the steps, prior to said mixing step, of:
    mixing crude kaolin clay with water and a chemical dispersant to produce a dispersed slip;
    refining the dispersed slip to remove sand and other large non-clay particles from the dispersed slip;
    removing iron from the refined, dispersed slip by chemical bleaching of the dispersed slip; and
    filtering the dispersed slip to produce a filter cake having from 53-68% solids and comprising hydrous kaolin clay,
    wherein said step of mixing a hydrous kaolin clay comprises mixing the filter cake with the water, the ammonium polyacrylate or polyacrylic acid, the ammonium hydroxide, and the propanolamine.

3. The method according to claim 1, wherein the weight ratio of the propanolamine to the ammonium polyacrylate or polyacrylic acid is about 4.75:1.

4. The method according to claim 1, wherein said mixing step comprises mixing the hydrous kaolin with the ammonium polyacrylate or polyacrylic acid in an amount of from 2.7% to 3.3% by weight, the ammonium hydroxide in an amount of 12.6% to 15.4% by weight ammonia, and the propanolamine in an amount of 5.1% to 6.3% by weight, the balance being substantially water.

5. The method according to claim 1, further comprising the step of heating the spray-dried, hydrous, kaolin clay to a temperature of from 500° C. to 850° C. to produce a metakaolin clay.

6. The method according to claim 1, further comprising the step of heating the spray-dried, hydrous, kaolin clay to a temperature of from above 800° C. to 1100° C. to produce a fully calcined clay.

7. The method according to claim 1, wherein the hydrous kaolin after said mixing step has from 50% to 65% solids.

8. The method according to claim 1, wherein the pH after said mixing step is from 7.6 to 10.

9. The method according to claim 1, wherein the pH after said spray drying step is from 5 to less than 8.5.

10. The method according to claim 1, wherein the viscosity of said slurry after said mixing step is less than 1000 cP under agitation for a period of 5 days after the slurry is formed.

11. The method according to claim 1, wherein the viscosity after said spray drying step is at least 2000 cP at 50% solids.

12. A spray-dried, hydrous kaolin clay, comprising a propanolamine selected from the group consisting of 2-amino-2-methyl-1-propanol, 2-methylamino-2-methyl-1-propanol, 1-amino-2-propanol, or mixtures thereof, and an ammonium polyacrylate or polyacrylic acid,
    wherein the amount of ammonium polyacrylate or polyacrylic acid is less than 18 pounds per ton of dry clay, and
    wherein the weight ratio of the propanolamine to the ammonium polyacrylate or polyacrylic acid is from 3.75:1 to 5.75:1.

13. The clay according to claim 12, wherein the amount of ammonium polyacrylate or polyacrylic acid is less than 15 pounds per ton of dry clay.

14. The clay according to claim 12, wherein the amount of ammonium polyacrylate or polyacrylic acid is less than 12 pounds per ton of dry clay.

15. The clay according to claim 12, wherein the clay if added to water is not substantially redispersible in water.

16. The clay according to claim 12, wherein the weight ratio of the propanolamine to the ammonium polyacrylate or polyacrylic acid is about 4.75:1.

17. The clay according to claim 12, wherein the pH is from 5 to less than 8.5.

18. The clay according to claim 12, wherein the viscosity is at least 2000 cP at 50% solids.

* * * * *